(12) United States Patent
Showalter

(10) Patent No.: US 7,435,199 B2
(45) Date of Patent: Oct. 14, 2008

(54) TRANSFER CASE WITH FORWARD HYDRAULIC CLUTCH

(75) Inventor: Dan J. Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 308 days.

(21) Appl. No.: 11/147,554

(22) Filed: Jun. 7, 2005

(65) Prior Publication Data

US 2005/0277509 A1   Dec. 15, 2005

Related U.S. Application Data

(60) Provisional application No. 60/578,943, filed on Jun. 12, 2004.

(51) Int. Cl.
*F16H 37/02* (2006.01)
*F16H 57/04* (2006.01)
*F16H 57/02* (2006.01)

(52) U.S. Cl. .................... 475/213; 475/160; 74/606 R

(58) Field of Classification Search ............... 475/159, 475/160, 210, 223; 74/665 F, 665 G, 665 GA, 74/665 GE, 606 R, 335; 180/233, 248, 249, 180/250

See application file for complete search history.

(56) References Cited

U.S. PATENT DOCUMENTS

| 4,367,661 | A | * | 1/1983 | Moroto et al. | 74/665 GE |
| 4,444,073 | A | * | 4/1984 | Moroto et al. | 74/665 G |
| 5,409,429 | A | * | 4/1995 | Showalter et al. | 475/295 |
| 6,173,624 | B1 | | 1/2001 | Decker | |
| 6,579,208 | B2 | | 6/2003 | Oliveira et al. | |
| 6,709,357 | B2 | * | 3/2004 | Schleuder et al. | 475/223 |
| 2002/0139215 | A1 | | 10/2002 | Smith et al. | |
| 2005/0101429 | A1 | * | 5/2005 | Allen et al. | 475/223 |

\* cited by examiner

*Primary Examiner*—Roger Pang
(74) *Attorney, Agent, or Firm*—Warn Partners, P.C.

(57) ABSTRACT

A two-speed segmented transfer case includes an automatic transmission side, and a transfer case side. The transfer case side having a gear reduction set, and a shift sleeve for selecting between the high, or direct drive speed, and the low, or reduced gear speed. The transmission side includes a hydraulic clutch which is used to transfer power from the transmission, to the front wheels. The hydraulic clutch is operated and controlled by the use of automatic transmission fluid that comes from the vehicle transmission. When fully engaged, the hydraulic clutch causes the power coming into the transfer case to be split between the front and rear wheels. This configuration allows for the elimination of a separate actuation system that would normally control the engagement of the clutch.

19 Claims, 2 Drawing Sheets

TRANSFER CASE WITH FORWARD HYDRAULIC CLUTCH

CROSS-REFERENCE TO RELATED APPLICATIONS

This application claims the benefit of U.S. Provisional Application No. 60/578,943, filed Jun. 12, 2004.

FIELD OF THE INVENTION

The present invention relates to two-speed transfer cases, more particularly, an apparatus for operating a two-speed transfer case through the use of hydraulic fluid from a vehicle transmission.

BACKGROUND OF THE INVENTION

The vast majority of transfer cases in the United States are used in conjunction with automatic transmissions. Transfer cases frequently contain clutch packs and shifting elements. Historically, these clutches and shifting elements have been powered by electric motors, magnetic coils, solenoids, and hydraulic pistons getting their pressure from pumps which are a part of the transfer case assembly. The automatic transmission has available hydraulic pressure that has not previously been used to perform transfer case functions due to issues with lubrication complexity. The oil level of the transfer case portion of the powertrain must be kept at a different level than the level mandated by the automatic transmission. This has required the regulation of a return pump in the transfer case to give back the oil to the automatic transmission. The pressure also has had to be routed through complex housings or through long rotating shafts. This configuration is expensive to manufacture and the benefits have not outweighed the increase in cost to use the automatic transmission pump and valve body for control of the transfer case functions.

SUMMARY OF THE INVENTION

The present invention is directed to a transfer case configuration that overcomes the above disadvantages. Accordingly, a first embodiment of the present invention is a transfer case having a segmented casing, including a first side in communication with a transmission and sump of transmission fluid. A second side of the transfer case is in communication with a transfer case sump. A drive shaft is positioned in the segmented casing and includes a drive end disposed in the first side of the casing for coupling with a transmission and an output end disposed in the second side of the casing. Circumscribed about the drive shaft is a sprocket shaft having a sprocket mounted thereon. The first embodiment also includes a hydraulic clutch positioned in the first side of the transfer case that is operably coupled between the drive shaft and the sprocket for transfer of rotation of the drive shaft to the sprocket.

A second embodiment of the present invention is a transfer case for use in a motor vehicle having a casing made up of two segments. A first segment is in communication with a transmission fluid sump, and a second segment is in communication with a transfer case fluid sump. A planetary gearset is disposed in the second segment with the transfer case fluid, and connected to the primary output shaft of the transfer case. A shaft having a first end coupled to the transmission is disposed in the first segment, and has a second end disposed in the second segment, wherein the second end is coupled to the planetary gearset. A sprocket is mounted on a sprocket shaft that circumscribes and rotates about the shaft. A hydraulic clutch is disposed in the first segment of the casing which is operated by the use of hydraulic fluid from the transmission, and couples the sprocket shaft to the planetary gearset.

In a third embodiment of the present invention, a method of actuating low to high shifts as well as engaging two-wheel and four-wheel drive modes in a transfer case using the fluid from an automatic transmission is described. The method includes separating a transfer case into two segments, a first segment in communication with a transmission and a sump of transmission fluid, and a second segment in communication with a transfer case side and a transfer case sump of fluid. A gear reduction set is also provided which is disposed in the second segment of the transfer case, driven by an input shaft, and in communication with a primary output shaft. Included in the third embodiment is a shift rail, mounted in the transfer case, which slides axially in the casing. A shift sleeve is operably disposed about the shift rail that is in communication with a bracket and the gear reduction set. A hydraulic clutch is disposed in the first segment of the transfer case, and a sprocket and sprocket tube assembly are in communication with the hydraulic clutch.

The transfer case layout has the low range gear set on the output side of the sprocket and chain. The biasing clutch is placed in front of the sprocket and chain. The front portion of the transfer case housing which separates the fluids of the automatic transmission and the transfer case is in a location between the biasing clutch and the sprocket and chain. This allows the biasing clutch to reside within the same lube environment as the automatic transmission. It also allows the shift force required to be generated hydraulically also in the front portion of the transfer case. All leakage and return oil from these functions will be kept within the automatic transmission sump and thereby eliminate the need for a return pump. The configuration shown in the drawings is an "on demand" type of transfer case. However, this principle is not limited to an on demand transfer case. It could be used with a differentiated all wheel drive transfer case. Although the present invention can be used to shift a two-speed transfer case, it is obvious that it is not limited to a two-speed transfer case. A single speed transfer case would be a far less complex assembly and may be much more economical than the traditional single speed configurations.

A hydraulic clutch is provided for shifting of the transfer case in the two-speed transfer case embodiment, it is usually smoother and easier to achieve precise control than electromotive actuated clutches. However, other types of clutch actuation can be utilized in the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
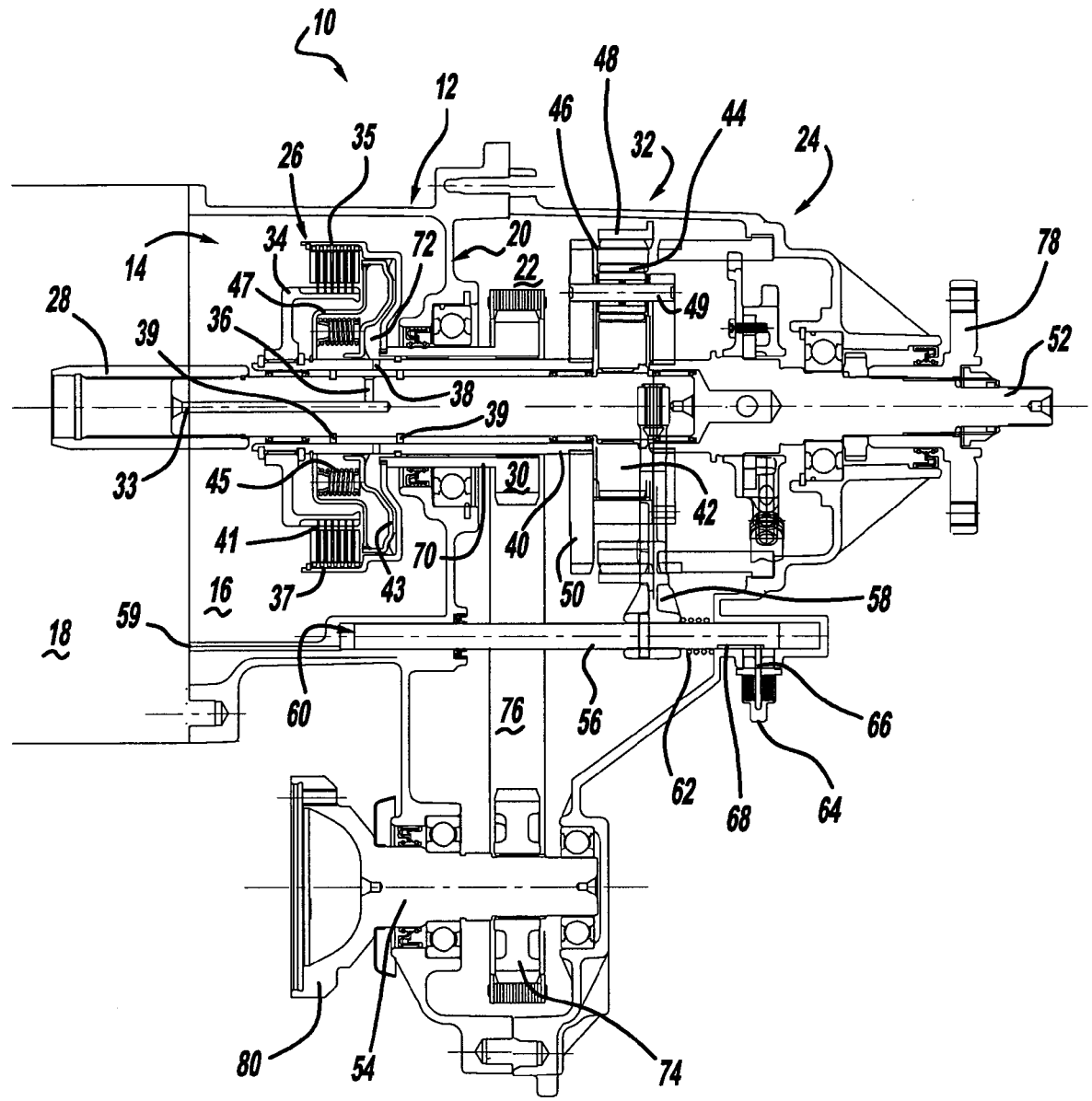
FIG. 1 is a sectional view of a transfer case in accordance with the present invention.

Referring now to FIG. 1, a transfer case of the present invention is generally shown at 10. Transfer case 10 includes a segmented casing 12 comprising a transmission side 14 and a transfer case side 24. The transmission side 14, which includes a transmission sump side 16 in communication with a transmission 18. A wall 20 separates the transmission sump side 16 from the transfer case side 24. The transfer case side 24 includes a transfer case sump 22. Within the transmission side 14, there is a hydraulic clutch 26 that is in communication with the input shaft 28 that is connected to the transmission 18 through the use of a gear reduction set 32. The hydraulic clutch 26 is comprised of clutch hub 34, clutch housing 35, apply piston 43, pressure plate spring 45, reaction plate 47, and a series of separator plates 37 interleaved with a series of friction plates 41. The friction plates 41 are splined at their inner diameter to clutch hub 34, and the separator plates are splined at their outer diameter to clutch housing 35. The hydraulic clutch 26 is engaged and released through the use of fluid pressure from a transmission pump (not shown). This allows for the hydraulic controls in the transmission 18 to also control the hydraulic clutch 26 in the transfer case 10.

Set forth in FIG. 1 is a 2-speed embodiment of the transfer case 10 of the present invention. Transfer case 10 includes an input shaft 28 coupled with a reduction gear set 32. The input shaft 28 is splined to the sun gear 42. The sun gear 42 is in communication with the planetary gears 44, which are also in communication with the ring gear 46. The planetary gears 44 are mounted on shafts 49 and are free to rotate thereon. The shafts 49 are connected to carrier 50, thereby providing a connection between the planetary gears 44 and the carrier 50. On the outside of the ring gear 46, there is a shift sleeve 48, which can slide forward and rotationally secure the ring gear 46 to the carrier 50, allowing the reduction gear set 32 to rotate together, and give a one-to-one or direct ratio between the input shaft 28 and front output shaft 54 and the rear output shaft 52. The rear output shaft 52 includes a primary propshaft 78 connected to a driveshaft (not shown), which is used for driving a first set of wheels. The output shaft 54 has a secondary propshaft 80, connected to a driveshaft (not shown), which is used to drive a second set of wheels.

When the shift sleeve 48 is in the position shown in FIG. 1, the reduction gear set 32 is in neutral, and the front output shaft 54 and rear output shaft 52 can rotate independently from each other. If the shift sleeve 48 is slid rearward, the ring gear 46 will be secured to the segmented casing 12, and the carrier 50 will rotate at a predetermined speed, that is a function of the sun gear 42 speed (between 2.5 and 3.0 to 1.0). A shift fork 58 connects the shift rail 56 longitudinally to the shift sleeve 48. The translation of the shift sleeve 48 is accomplished by sliding the shift rail 56. The shift rail 56 is moved by hydraulic pressure (coming from the pump of transmission 18) on the end of the round cross-section 60. The hydraulic pressure is fed through channel 59 and applies pressure to the round cross-section 60. The default position for the shift rail 56 is the direct-drive position (in which the shift rail 56 is positioned all the way to the left). The shift rail 56 is held in the default position and biased in that direction by a return spring 62. Hydraulic pressure is applied to the end of the shift rail 56 opposite the return spring 62 for shifting the gear reduction set 32. The shift rail 56 is held in the neutral position by way of a solenoid 64 that, once engaged, inserts a pin 66 into a slot 68 on the shift rail 56, only allowing the shift rail 56 to slide to a position such that the shift sleeve 48 is in a position such that the ring gear 46 is not engaged to the carrier 50 or the segmented casing 12.

The carrier 50 is permanently splined to the rear output shaft 52 on a first side, on a second side the carrier 50 is splined to the torque tube 40. The torque tube 40 extends forward, through the sprocket 30, to the hydraulic clutch 26. The hydraulic clutch 26 frictionally connects the torque tube 40 to the sprocket shaft 70 that returns torque to the sprocket 30. The sole driving torque to the sprocket 30 is delivered by the hydraulic clutch 26. This can be modulated by regulating the hydraulic apply pressure. Hydraulic supply pressure comes from the transmission 18, preferably a transmission oil pump is used for the source of the hydraulic pressure.

In FIG. 1, when the use of four-wheel drive or all wheel drive is not necessary, the hydraulic clutch 26 is not engaged. The pressure plate spring 45 biases the apply piston 43 away from the friction plates 41 and separator plates 37. When engagement of the four-wheel or all-wheel drive capabilities of the vehicle become necessary, the hydraulic apply pressure is delivered through the hollow bore 33 in the center of the input shaft 28 and outwardly through a radial bore 36, and then through a radial drilled hole 38 in the intermediate torque tube 40 into the pressure chamber 72. The hydraulic clutch seals 39 only allow transmission fluid to be transferred into the pressure chamber 72, and do not allow any of the transmission fluid to leak into any other parts of the transfer case 10. As transmission fluid fills pressure chamber 72, the pressure applied to the apply piston 43 is greater than the force exerted by the pressure plate spring 45, and the apply piston 43 is forced toward the friction plates 41 and separator plates 37, causing the friction plates 41 to frictionally engage the separator plates 37 and achieve the same speed.

Once the hydraulic clutch 26 is fully engaged, torque is transferred from the input shaft 28 through the gear reduction set 32, either at a one-to-one or reduced gear ratio, through torque tube 40, to the clutch hub 34, through the engaged friction plates 41 and separator plates 37, through the housing 35, through the sprocket shaft 70, and to the sprocket 30. The driven sprocket 30, transfers driving torque by means of the chain 76 to the front output sprocket 74 that is splined to the front output shaft 54. As will be readily appreciated by those skilled in the art, gears could be used, instead of the sprockets, in a conventional manner.

It should also be noted that driving the primary propshaft 78 and secondary propshaft 80 through splined engagements to either side of the carrier 50 can result in drive train windup through the transfer case. This is avoided in this assembly by the simple relief of pressure in the hydraulic clutch 26.

It should also be noted that the hydraulic clutch 26 may be partially engaged so as to provide only a partial torque transfer to the secondary propshaft 80. Partially engaging the hydraulic clutch 26 may be more beneficial for certain driving conditions than full engagement.

Figure 2:
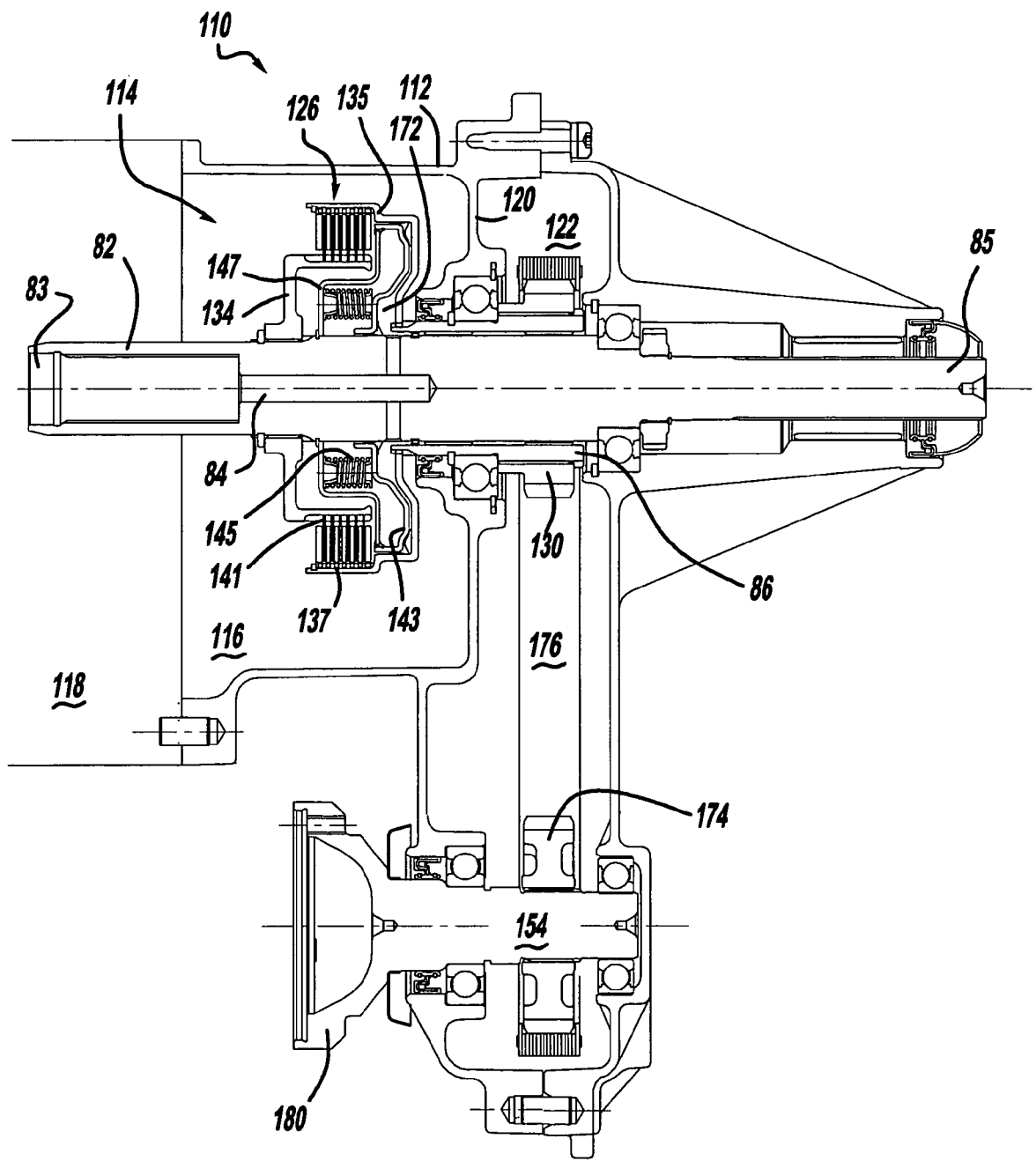
FIG. 2 is a sectional view of an alternative single-speed embodiment of the present invention.

An alternate embodiment of the present invention is a single-speed transfer case design. This single-speed embodiment is generally shown at 110 in FIG. 2, wherein like numbers differing by 100 refer to like elements. Transfer case 110 operates in a similar fashion as the two-speed design, but it does not incorporate the use of the gear reduction set 32 in conjunction with the separate input shaft 28 and output shaft 52. In this embodiment, there is a single input shaft 82 that runs through the transfer case 110, and includes a driven end portion 83 and a drive end portion 85. The hydraulic clutch 126 operates in similar fashion as the two-speed design; the hydraulic fluid is delivered through the bore 84 of the input shaft 82, but does not need to be fed through the intermediate torque tube 40 as in the two-speed design. In this design, there is no intermediate torque tube 40, such as the one connecting the gear reduction set 32 to the hydraulic clutch 26 in the two-speed design. However, there is a connection shaft 86 that connects the hydraulic clutch 126 to the drive sprocket 130. When the hydraulic clutch 126 is engaged, torque is not only transferred through the input shaft 82, but is also transferred through the connection shaft 86 to the drive sprocket 130, the drive sprocket 130 in turn communicates torque through the chain 176 to the driven sprocket 174, delivering torque to the front propshaft 180.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case comprising:
   a segmented casing, including a first side in communication with a transmission and sump of transmission fluid, and a second side that is in communication with a transfer case sump;
   an input shaft positioned in said housing and including a drive end disposed in said first side of said segmented casing, said drive end being directly coupled to said transmission and provides fluid communication between said transmission and said segmented casing, and an output end disposed in said second side of said segmented casing, said input shaft selectively coupled to an output shaft;
   a sprocket attached to a sprocket shaft; and
   a clutch positioned in said first side of the transfer case that is operably coupled between said input shaft and said sprocket for transfer of rotation of said input shaft to said sprocket.

2. The transfer case of claim 1 wherein said clutch is engageable by hydraulic fluid received from said sump of transmission fluid.

3. The transfer case according to claim 1 wherein said input shaft is operatively connected to said output shaft by way of a gear reduction set and said sprocket is driven through said gear reduction set.

4. The transfer case of claim 3 wherein said gear reduction set is in operable communication with both said input shaft and said output shaft and is capable of producing a direct, or one-to-one ratio, between said input and output shafts, as well as a 3 or 4 to 1 ratio between said input and output shafts.

5. A transfer case, comprising:
   a segmented casing, including a first side in communication with a transmission, and a second side that is in communication with a transfer case sump;
   an input shaft positioned in said housing and including a drive end disposed in said first side of said segmented casing, said drive end being directly coupled to said transmission and provides fluid communication between said transmission and said segmented casing, and an output end disposed in said second side of said segmented casing, said input shaft selectively coupled to an output shaft;
   a sprocket attached to a sprocket shaft; and
   a clutch positioned in said first side of the transfer case that is operably coupled between said input shaft and said sprocket for transfer of rotation of said input shaft to said sprocket;
   wherein said input shaft is operatively connected to said output shaft by way of a gear reduction set and for producing multiple gear ratios, said sprocket is driven through said gear reduction set; and
   a shift sleeve which is positioned in communication with said gear reduction set, upon bi-directional lateral movement of said shift sleeve, said gear reduction set can be actuated to produce said multiple gear ratios.

6. A transfer case, comprising:
   a segmented casing, including a first side in communication with a transmission, and a second side that is in communication with a transfer case sump;
   an input shaft positioned in said housing and including a drive end disposed in said first side of said segmented casing, said drive end being directly coupled to said transmission and provides fluid communication between said transmission and said segmented casing, and an output end disposed in said second side of said segmented casing, said input shaft selectively coupled to an output shaft;
   a sprocket attached to a sprocket shaft; and
   a clutch positioned in said first side of the transfer case that is operably coupled between said input shaft and said sprocket for transfer of rotation of said input shaft to said sprocket; and
   a shift rail that is operably disposed within said transfer case and is slidably mounted to said segmented casing, said shift rail being in communication with a return spring on a first side, and a second side being in communication with said first side of said segmented casing, said second side being capable of being actuated by hydraulic fluid from said sump of transmission fluid for moving said shift rail.

7. The transfer case of claim 6, further comprising a bracket which is slidably disposed about said shift rail and is in communication with said shift rail and a shift sleeve.

8. A transfer case comprising:
   a segmented casing, including a first side in communication with a transmission and sump of transmission fluid, and a second side that is in communication with a transfer case sump;
   an input shaft positioned in said housing and including a drive end disposed in said first side of said segmented casing for coupling with said transmission and an output end disposed in said second side of said segmented casing, said input shaft selectively coupled to an output shaft;
   a sprocket attached to a sprocket shaft;
   a clutch positioned in said first side of the transfer case that is operably coupled between said input shaft and said sprocket for transfer of rotation of said input shaft to said sprocket; and
   a shift rail that is operably disposed within said transfer case and is slidably mounted to said segmented casing, said shift rail being in communication with a return spring on a first side, and a second side being in communication with said first side of said segmented casing, said second side being capable of being actuated by hydraulic fluid from said sump of transmission fluid for moving said shift rail; and
   a solenoid controlled neutral position, wherein said shift rail is positioned hydraulically into a neutral position, said shift rail including an aperture therein, a solenoid positioned such that a pin of said solenoid engages said aperture for holding said shift rail in a neutral position.

9. A transfer case for use in a motor vehicle, comprising:
a casing made up of two segments, wherein a first segment is in communication with a transmission fluid sump, and a second segment is in communication with a transfer case fluid sump;
a planetary gearset disposed in said second segment with said transfer case fluid, and connected to a primary output shaft of said transfer case;
a shaft having a first end coupled to a transmission, and disposed in said first segment, and a second end disposed in said second segment, wherein said second end is coupled to said planetary gearset;
a sprocket mounted on a sprocket shaft; and
a hydraulic clutch disposed in said first segment of said casing that is operated by the use of hydraulic fluid from said transmission, wherein said hydraulic clutch operably connects said sprocket shaft to said planetary gearset.

10. The transfer case of claim 9, wherein said planetary gearset is capable of producing a direct, or one-to-one ratio, between said shaft and said primary output shaft, as well as a 3 or 4 to 1 ratio between said shaft and said primary output shaft.

11. The transfer case of claim 9, further comprising a shift rail mounted inside said casing, wherein a first side of said shift rail is in communication with a return spring, and a second side of said shift rail is in communication with said transmission fluid sump.

12. The transfer case of claim 11, further comprising a bracket circumferentially mounted onto said shift rail, in communication with said shift rail and said shift sleeve.

13. The transfer case of claim 11, wherein said shift rail can be positioned in a neutral position, and has an aperture that can be engaged by an arm of a solenoid, wherein said arm of said solenoid restricts said return spring from biasing said shift rail into a position where one of said gear ratios is engaged, and holds said shift rail in a neutral position.

14. The transfer case of claim 9, wherein said return spring biases said shift rail in said direct, or one-to-one, ratio position.

15. The transfer case of claim 9, further including a shift sleeve which is in communication with said planetary gearset, and can be moved axially to manipulate said planetary gearset to produce said gear ratios.

16. A method of actuating low to high shifts as well as engaging two-wheel and four-wheel drive modes in a transfer case using the fluid from an automatic transmission, comprising the steps of:
separating a transfer case into two segments, a first segment in communication with a transmission and a transmission fluid sump, and a second segment in communication with a transfer case side, and a transfer case sump;
providing a gear reduction set disposed in said second segment of said transfer case, driven by an input shaft, and in communication with a primary output shaft;
providing said input shaft having a drive end directly coupled to said transmission;
providing fluid communication between said transmission and said segmented casing with said input shaft;
providing a shift sleeve operably associated with said gear reduction set;
providing a shift rail, mounted in said transfer case, to slide axially in said casing;
providing a bracket operably disposed about said shift rail, which is in communication with said shift sleeve;
providing a hydraulic clutch disposed in said first segment of said transfer case;
providing a sprocket and sprocket tube assembly in communication with said clutch;
actuating said shift rail with fluid from said transmission on a first side,
providing a return spring, and placing said return spring in communication with said shift rail on a second side; and
positioning said shift sleeve in relation to said gear reduction set so as to provide for a one-to-one ratio, or a reduced speed ratio.

17. A method of actuating low to high shifts as well as engaging two-wheel and four-wheel drive modes in a transfer case using the fluid from an automatic transmission, comprising the steps of:
separating a transfer case into two segments, a first segment in communication with a transmission and a transmission fluid sump, and a second segment in communication with a transfer case side, and a transfer case sump;
providing a gear reduction set disposed in said second segment of said transfer case, driven by an input shaft, and in communication with a primary output shaft;
providing said input shaft having a drive end directly coupled to said transmission;
providing fluid communication between said transmission and said segmented casing with said input shaft;
providing a shift sleeve operably associated with said gear reduction set;
providing a shift rail, mounted in said transfer case, to slide axially in said casing;
providing a bracket operably disposed about said shift rail, which is in communication with said shift sleeve;
providing a hydraulic clutch disposed in said first segment of said transfer case;
providing a sprocket and sprocket tube assembly in communication with said hydraulic clutch; and
actuating said hydraulic clutch with said transmission fluid from said first segment of said transfer case, and delivering power to said sprocket and sprocket tube assembly when said hydraulic clutch is engaged.

18. A method as of actuating low to high shifts as well as engaging two-wheel and four-wheel drive modes in a transfer case using the fluid from an automatic transmission, comprising the steps of:
separating a transfer case into two segments, a first segment in communication with a transmission and a transmission fluid sump, and a second segment in communication with a transfer case side, and a transfer case sump;
providing a gear reduction set disposed in said second segment of said transfer case, driven by an input shaft, and in communication with a primary output shaft;
providing a shift sleeve operably associated with said gear reduction set;
providing a shift rail, mounted in said transfer case, to slide axially in said casing;
providing a bracket operably disposed about said shift rail, which is in communication with said shift sleeve;
providing a hydraulic clutch disposed in said first segment of said transfer case;
providing a sprocket and sprocket tube assembly in communication with said hydraulic clutch;
providing said shift rail to be further comprised of an aperture;
engaging said aperture with an arm from a solenoid; and
holding said shift sleeve in a position such that the gear reduction set does not engage said output shaft when said arm of said solenoid is engaged with said aperture of said shift rail.

19. A method of actuating low to high shifts as well as engaging two-wheel and four-wheel drive modes in a transfer case using the fluid from an automatic transmission, comprising the steps of:

- separating a transfer case into two segments, a first segment in communication with a transmission and a transmission fluid sump, and a second segment in communication with a transfer case side, and a transfer case sump;
- providing a gear reduction set disposed in said second segment of said transfer case, driven by an input shaft, and in communication with a primary output shaft;
- providing a shift sleeve operably associated with said gear reduction set;
- providing a shift rail, mounted in said transfer case, to slide axially in said casing;
- providing a bracket operably disposed about said shift rail, which is in communication with said shift sleeve;
- providing a hydraulic clutch disposed in said first segment of said transfer case;
- providing a sprocket and sprocket tube assembly in communication with said hydraulic clutch;
- providing a return spring; and
- biasing said shift rail with said return spring to manipulate said gear set to operate at the direct, or one-to-one, gear ratio, by said return spring.

* * * * *